Aug. 9, 1927.
H. V. PUTMAN
1,638,274
STARTING APPARATUS FOR SYNCHRONOUS MOTORS
Filed May 3. 1924
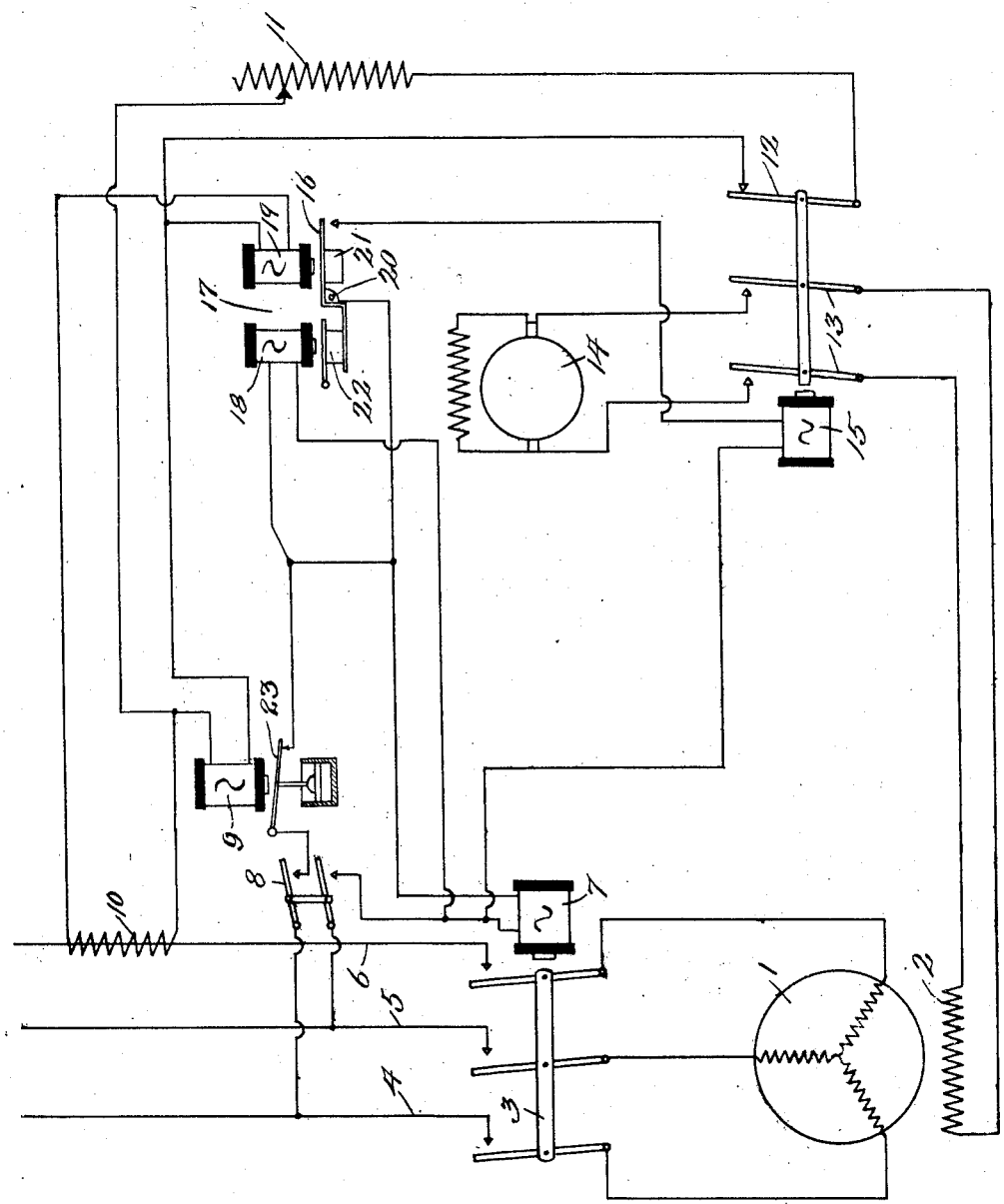
Inventor:
Henry V. Putman
By Nissen & Dunne
Att'ys Patented Aug. 9, 1927.

1,638,274

UNITED STATES PATENT OFFICE.

HENRY V. PUTMAN, OF MANSFIELD, OHIO, ASSIGNOR TO THE IDEAL ELECTRIC & MANUFACTURING COMPANY, OF MANSFIELD, OHIO, A CORPORATION OF OHIO.

STARTING APPARATUS FOR SYNCHRONOUS MOTORS.

Application filed May 3, 1924. Serial No. 710,705.

This invention relates to starting apparatus for synchronous motors including an overload relay and a bypass shunt for said relay during the starting period.

The invention has for its object the provision of means for preventing the increased starting current from actuating the overload relay while permitting the overload relay to properly function after the motor has been brought to full speed.

Other objects of the invention will appear hereinafter.

The invention is exemplified in the combination and arrangement of parts shown in the accompanying drawing and described in the following specification and it is more particularly pointed out in the appended claims.

In the drawing, the figure is a diagrammatic representation of a synchronous motor and the starting circuit therefor. It should be borne in mind that a synchronous motor is commonly started as a squirrel cage induction motor and that the field is disconnected from its energizer during the starting period but is connected after the motor is brought up to synchronism. During the starting period an inrush of current flows to the motor which is of sufficient value to cause damage if it were continued for an extended period of time. It will therefore be seen that if an overload relay were provided to protect the motor circuit this relay would be actuated by the starting current. The present invention provides a bypass shunt for the overload relay which operates during the starting period, but is disconnected during the running period. This bypass is connected through the switch which controls the field circuit so that when the field circuit switch is thrown to energize the field of the motor the bypass relay is disconnected.

An inverse time limit overload relay is ordinarily used for protecting the motor circuit power line which is usually adjusted to trip in from fifteen to twenty seconds with perhaps twenty per cent more than normal current in the main line. During the starting period the current in the main line may reach as high as three hundred or four hundred per cent for a few seconds, the time depending upon the rate of acceleration of the motor. It is obvious therefore that if it were not for the bypass shunt and all of the three hundred or four hundred per cent overload current were permitted to flow through the overload relay, even for a few seconds, it would trip. The bypass shunt is arranged to bypass just enough of the inrush current so that during a normal starting period the overload relay will not trip. If, however, the motor should be overloaded during the starting period or if the starting period should be prolonged for any reason, the overload relay would trip. When the motor has come up to nearly normal speed the accelerating relay closes the field switch causing the motor to pull into step. The closing of the field switch opens the circuit of the bypass shunt so that during the running period the overload relay is free to trip at whatever value and time it is set for, as for example, twenty per cent overload in twenty seconds.

Referring more particularly to the drawing, the numeral 1 designates a synchronous motor having a field winding 2 and a main control switch 3 which connects the windings of the motor with the power lines 4, 5 and 6 of a three-phase circuit. The main line circuit switch 3 is closed by a relay magnet 7 to which power is supplied from the power lines 4 and 5 through a hand switch 8. The relay magnet 7 is controlled by an inverse time limit overload relay 9 to which current is supplied from a current transformer 10 connected with the power line 6. The relay 9 may be of any well-known construction, the usual form is one in which the switch is connected with a dashpot so that the time required to open the switch is inversely proportional to the overload current in the relay.

In shunt with the relay magnet 9 is a resistance 11 controlled by a switch 12 connected up with the double switch 13 which controls the circuit for the exciter generator 14. The field switch 13 is controlled by a relay magnet 15 which is supplied with current through the switch 8, the circuit for the relay magnet 15 passing through the control switch 16 of a relay 17 having two solenoids 18 and 19. The relay 17 may be of any well-known construction arranged to close the switch 16 when the current in the supply line has decreased to approximately the normal load current. Relays of this nature are well known in the art and are used for connecting in the exciter for the field when the synchronous motor has come up to speed.

In the drawing, the relay is represented diagrammatically as having a constant potential solenoid 18 and a current solenoid 19 which is supplied with current from the transformer 10.

The switch member 16 is pivoted at 20 and is provided with a weight 21. The weight 21 is overbalanced by a second weight 22 in position to be lifted by the potential solenoid 18. When the switch 8 is closed to start the motor the solenoid 19 sustains the weight 21 so that the switch is maintained open. At the same time the potential solenoid 18 raises the weight from the tailpiece of the switch 16. As the motor comes up to speed the current in the transformer 10 and consequently in the solenoid 19 diminishes until the weight 21 is released and the switch 16 is closed. This closing of the switch actuates the relay magnet 15 to close the field circuit switch 13 and simultaneously open the bypass switch 12. It will thus be seen that to start the motor it is only necessary to close the hand switch 8. This energizes the relay magnet 7 which closes the main line switch 3. If normal starting current is flowing the switch 23 controlled by the inverse time limit relay 9 will remain closed. This is due to the fact that the current induced in the transformer 10 is divided and part flows through the bypass 11. If for any reason during starting excess current flows in the main line for a sufficient length of time the relay magnet 9 will open the switch 23, thus breaking the circuit of the relay magnet 7 and opening the main line switch.

After the motor has come up to speed the relay 17 will close the circuit of the relay magnet 15 which in turn will close the switch 13 and connect the exciter with the field 2. At the same time switch 12 will be opened so that the bypass 11 is taken out of service. This permits the overload relay 9 to continue its protection of the motor circuit during normal operation.

Having thus described my invention, what I claim as new and desire to secure by Letters Patent of the United States is:

1. The combination with a motor, of a switch for controlling the supply of current thereto, an overload relay for controlling said switch, a bypass shunt for said relay, and means for disconnecting said bypass shunt when said motor approaches normal operating speed.

2. The combination with a synchronous motor, of an inverse time limit overload relay for controlling the supply circuit to said motor, a bypass shunt for said relay, and means governed by the current flowing to said motor for controlling said bypass shunt.

3. The combination with a synchronous motor, of an overload relay for controlling the circuit to said motor, a bypass shunt for said relay, and a relay for opening the circuit of said shunt when said motor has attained a predetermined speed.

4. The combination with a synchronous motor, of a main line switch for controlling said motor, an overload relay for opening said switch when excessive current flows to said motor, a bypass shunt for said overload relay, a switch for controlling the field circuit of said motor, a relay for closing said last-named switch when said motor attains a predetermined speed, and means for opening the circuit of said bypass shunt simultaneously with the closing of said field circuit switch.

5. The combination with a synchronous motor, of an exciter for supplying current to the field of said motor, a switch for controlling the connection between said exciter and field, an overload relay for protecting said motor against excessive currents, a bypass shunt for said overload relay, and means connected with said field circuit switch for opening said bypass shunt simultaneously with the closing of said field circuit switch.

6. The combination with a synchronous motor having a main line switch for controlling current supplied thereto, a direct current exciter for supplying current to the field winding of said motor, a field circuit switch for controlling connection between said exciter and said field winding, a relay for closing said field circuit switch when said motor has attained a predetermined speed, an overload relay for opening said main line switch, a bypass for said overload relay, and means controlled by said first-mentioned relay for opening said bypass.

7. The combination with a synchronous motor, of a main line switch for controlling the current to said motor, an overload relay for controlling said main line switch, a current transformer connected with the supply circuit for said motor for operating said overload relay, a bypass shunt for said overload relay, and means for opening said bypass shunt to permit operation of said overload relay independently of said bypass shunt during full speed operation of said motor.

8. The combination with a motor, of an overload relay for controlling the power supplied to said motor, a bypass shunt for said relay, and means for connecting said bypass shunt in parallel with said overload relay while said motor is being started and for disconnecting said bypass shunt after said motor has attained substantially normal speed.

9. The combination with a motor, of an overload relay for controlling the circuit of said motor, a bypass shunt for said relay, and means for automatically connecting said bypass shunt in parallel with said overload relay during starting of said motor and for disconnecting said shunt when said motor has attained substantially normal speed.

10. The combination with a synchronous motor, of a main line switch for controlling said motor, a magnet for closing said switch, an overload relay for controlling said main line switch magnet, a bypass shunt for said overload relay, and a relay for automatically opening said bypass shunt when said motor has attained substantially normal speed.

11. The combination with a synchronous motor having a main line circuit for supplying current thereto, a main line switch for controlling said circuit, a magnet for closing said switch, an inverse time limit overload relay for controlling said main line switch relay, a hand switch for controlling said main line switch relay, a bypass shunt for said inverse time limit overload relay, and means for automatically opening said bypass shunt when said motor has attained substantially normal speed.

12. The combination with a synchronous motor having field windings, a direct current generator for exciting said field windings, an inverse time limit overload relay for controlling the power circuit of said motor, a bypass shunt for said overload relay, and a common means for controlling the connection between said exciter generator and field circuit and said bypass shunt.

13. The combination with a synchronous motor having a field circuit and a power line circuit, a main line switch for controlling said power line circuit, an overload relay for opening said main line switch, a direct current generator for supplying current to said field winding, a switch for controlling said field winding circuit, a bypass shunt for said overload relay, and a relay arranged to close said field circuit switch and open said bypass shunt when said motor has attained a predetermined speed.

14. The combination with a synchronous motor having a main line circuit for supplying power thereto, a switch for controlling said main line circuit, a magnet for closing said switch, a hand switch for controlling said relay, an inverse time limit overload switch for controlling said relay, a current transformer connected with said supply line for energizing said overload relay, a bypass shunt for said overload relay, a direct current generator for exciting the field windings of said synchronous motor, a switch for controlling the connection between said generator and said field windings, said switch having means thereon for opening said bypass shunt simultaneously with the closing of said field circuit switch, a magnet for actuating said field circuit switch, and a relay connected with said current transformer and arranged to actuate the relay for controlling said field circuit switch to close said field circuit switch and open said bypass shunt when the current has decreased to a predetermined amount in said current transformer.

In testimony whereof I have signed my name to this specification on this 4th day of April, A. D. 1924.

HENRY V. PUTMAN.